United States Patent
Ito et al.

(10) Patent No.: US 7,035,430 B2
(45) Date of Patent: Apr. 25, 2006

(54) INTRUDING OBJECT DETECTION METHOD AND INTRUDING OBJECT MONITOR APPARATUS WHICH AUTOMATICALLY SET A THRESHOLD FOR OBJECT DETECTION

(75) Inventors: Wataru Ito, Kodaira (JP); Hiromasa Yamada, Beppu (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 461 days.

(21) Appl. No.: 09/983,831

(22) Filed: Oct. 26, 2001

(65) Prior Publication Data

US 2002/0071034 A1   Jun. 13, 2002

(30) Foreign Application Priority Data

Oct. 31, 2000   (JP)   ............................. 2000-333125

(51) Int. Cl.
*G06K 9/00*   (2006.01)
(52) U.S. Cl. ................. 382/103; 382/270; 358/3.22; 348/169
(58) Field of Classification Search ................ 382/270, 382/273, 275, 103; 340/152; 348/152, 155
See application file for complete search history.

(56) References Cited

U.S. PATENT DOCUMENTS 4,737,847 A * 4/1988 Araki et al. ................. 348/161
5,926,570 A * 7/1999 Smitt .......................... 382/237
5,949,905 A * 9/1999 Nichani et al. .............. 382/173
6,404,455 B1   6/2002 Ito et al. ...................... 348/169
6,445,409 B1   9/2002 Ito et al. ...................... 348/155
6,546,115 B1   4/2003 Ito et al. ...................... 382/100

FOREIGN PATENT DOCUMENTS

| CN | 1998066894 | 10/1998 |
|----|-----------|---------|
| JP | 520558 | 1/1993 |
| JP | A-7-79429 | 3/1995 |
| JP | 1141589 | 2/1999 |
| JP | 11284988 | 10/1999 |

OTHER PUBLICATIONS

U.S. Appl. No. 09/078,521, filed May 14, 1998, Ito et al.
U.S. Appl. No. 09/362,212, filed Jul. 28, 1999, Ito et al.
U.S. Appl. No. 09/392,622, filed Sep. 9, 1999, Ito et al.

* cited by examiner

*Primary Examiner*—Brian Werner
*Assistant Examiner*—Christopher Lavin
(74) *Attorney, Agent, or Firm*—Mattingly, Stanger, Malur & Brundidge, P.C.

(57) ABSTRACT

A monitoring method and apparatus for detecting an intruding object within a monitoring field of view by applying a subtraction method to an image obtained from an imaging device. A differential image of luminance values between an input image from the imaging device and a reference background image stored in a storage device is generated. The differential image is binarized using a predetermined binarization threshold value and the bianrization threshold value is changed until a noise level of a bianrized image becomes not greater than a predetermined value and based on a binarization threshold value at which the noise level becomes not greater than the predetermined value, an intruding object is detected.

4 Claims, 13 Drawing Sheets

INTRUDING OBJECT DETECTION METHOD AND INTRUDING OBJECT MONITOR APPARATUS WHICH AUTOMATICALLY SET A THRESHOLD FOR OBJECT DETECTION

CROSS-REFERENCE TO RELATED APPLICATIONS

This invention relates to the following U.S. patent applications:

U.S. patent application Ser. No. 09/078,521 filed on May 14, 1998, now U.S. Pat. No. 6,404,455, in the names of Wataru Ito, Hirotada Ueda, Toshimichi Okada and Miyuki Endo and entitled "METHOD FOR TRACKING ENTERING OBJECT AND APPARATUS FOR TRACKING AND MONITORING ENTERING OBJECT":

U.S. patent application Ser. No. 09/362,212 filed on Jul. 28, 1999, now U.S. Pat. No. 6,445,409, in the names of Wataru Ito, Hirotada Ueda and Hiromasa Yamada and entitled "METHOD OF DISTINGUISHING A MOVING OBJECT AND APPARATUS OF TRACKING AND MONITORING A MOVING OBJECT", which is a Continuation-in-part of U.S. Ser. No. 09/078,521: and U.S. patent application Ser. No. 09/392,622 filed on Sep. 9, 1999, now U.S. Patent No. 6,546,115, in the names of Wataru Ito, Hirotada Ueda and Hiromasa Yamada and entitled "METHOD OF UPDATING REFERENCE BACKGROUND IMAGE, METHOD OF DETECTING ENTERING OBJECTS AND SYSTEM FOR DETECTING ENTERING OBJECTS USING THE METHODS".

BACKGROUND OF THE INVENTION

The present invention relates to a monitor apparatus using an imaging device, or in particular to an intruding object detection method and an intruding object monitor apparatus for detecting an intruding object within an imaging field of view based on an area having pixels for each of which the difference in luminance or brightness between an input image from the imaging device and a reference background image is not less than an intruding object detection threshold, or more in particular to an intruding object detection method, a detection parameter setting method and an intruding object monitor apparatus for determining the intruding object detection threshold automatically based on the input image from the imaging device.

In recent years, an intruding object detection apparatus using an imaging device such as a camera as image input means has often been operated not manually by a monitor operator but automatically by detecting an intruding object within a monitor view of field or automatically checking the category of the object and issuing a predetermined announcement or alarm. An example is described in JP-A-7-79429.

In order to realize the system described above, the first requirement is the process for detecting a predetermined intruding object from an input image obtained by image input means such as a camera. In a method of realizing such a process, an input image is compared with a reference background image (i.e. an image not containing an object to be detected) to determine a difference for each pixel, and an area having a large difference is extracted as an object. This method is called a subtraction method and has been widely used.

The process of the subtraction method will be explained with reference to FIG. 12, which is a diagram showing the principle of the object detect operation according to the subtraction method. Reference numeral 1201 designates an input image, numeral 1202 a reference background image, numeral 1203 a difference image, numeral 1204 a binarized image of the difference image 1203, numeral 1205 a subtractor, numeral 1206 a binarizer, numeral 1207 an area of an human-shaped object contained in the input image 1201, numeral 1208 a differential area having a difference in the difference image 1203, and numeral 1209 a binarized area extracted from the binarized image 1204.

In FIG. 12, the subtractor 1205 calculates the difference of the brightness value between the input image 1201 and the reference background image 1202 for each pixel and outputs the difference image 1203. The binarizer 1206 produces a binarized image 1204 assuming for each pixel that pixels having the pixel value (difference value) in the difference image 1203 less than a predetermined threshold Th (difference value<Th) have the pixel value "0" and pixels having the pixel value of the difference image 1203 not less than the threshold Th (difference value≧Th) have the pixel value "255" (the pixel value of each pixel is calculated in 8 bits). The threshold Th is set to, say, "20".

As a result, the human-shaped object 1207 contained in the input image 1201 is processed in such a manner that an area 1208 having developed a difference is calculated by the subtractor 1205, and a cluster of pixels constituting an image 1209 having the brightness value of "255" as produced from the binarizer 1206 is detected as an intruding object.

An example of the intruding object recognition method using this method will be explained with reference to FIG. 13. FIG. 13 is a flowchart showing the operation of an intruding object detection program for executing the intruding object detection method.

In an image input step 111, an input image 1201 having a width of 320 pixels, a height of 240 pixels, 8 bits per pixel, is acquired from an imaging device such as a TV camera, and then the process proceeds to step 112.

In the subtraction processing step 112, the difference between the input image 1201 and the background reference image 1202 is determined for each pixel and the difference image is acquired, followed by proceeding to step 113.

In the binarization processing step 113, the acquired difference image 1203 is processed based on a predetermined binarization threshold in such a manner that the pixels having a value not less than the intruding object detection threshold are defined as "255" and the pixels having a value less than the intruding object detection threshold are defined as "0". In this way, the binarized image 1204 is acquired, followed by proceeding to step 114.

In the intruding object detection processing step 114, a cluster of pixels having the pixel value of "255" is detected from the binarized image 1204 by the labelling method, for example, and determined as an intruding object, followed by proceeding to step 115.

In the intruding object determining step 115, the process proceeds to step 116 in the case where an intruding object is detected in the intruding object detection processing step 114, while the process returns to the image input step 111 in the case where no intruding object is detected.

In the alarm/monitor display step 116, the processing result is displayed on a monitor 1113, for example, through an image I/F (the interface is hereinafter referred to as I/F) or an alarm lamp 1112 is turned on, for example, through an output I/F 1109.

In this way, according to the intruding object detection method using the subtraction method, the input image is compared with the reference background image to determine a difference for each pixel, and an area associated with a large difference is detected as an object. An object detection method using the subtraction method is described, for example, in JP-A-7-79429.

In this intruding object detection method, an intruding object is detected by comparing the difference between an input image and a reference background image for each pixel with a preset intruding object detection threshold.

In the case where the intruding object detection threshold is set to a small value, noise other than the intruding object (noise generated in the imaging device and noise superposed during the transmission of video signals) or objects other than the intruding object such as nodding trees are liable to be erroneously detected.

In the case where the intruding object detection threshold is set to a large value, on the other hand, those pixels making up an intruding object which have a brightness value approximate to those of the reference background image cannot be detected, and therefore an intruding object may be overlooked.

For this reason, the detection performance of an intruding object depends to a large measure on the intruding object detection threshold. The intruding object detection threshold, however, is required to be set in accordance with the luminance of the monitor view of field, the time zone and of the day (i.e., the time of the day) and the iris of the lens. This setting work is complicated and requires a high skill.

Further, in the case where an intruding object is detected using the subtraction method, the value to which the intruding object detection threshold is set is important. In the prior art, the setting work is burdensome as it is required to be carried out each time the luminance of the monitor field of view, the time zone of the day or the iris of the lens undergoes a change. Another disadvantage of the prior art lies in that it requires a high skill to set an intruding object detection threshold by automatically calculating the intruding object detection threshold whereby noises other than the intruding object can be removed from the input image acquired from the imaging device on the one hand and an intruding object detection threshold based on the detection of the reference intruding object contained in the imaging field of view on the other hand.

SUMMARY OF THE INVENTION

The object of the present invention is to obviate the above-mentioned disadvantages and to provide an intruding object detection parameter setting method, an intruding object detection method and an intruding object recognition apparatus which reliably require no skill in the work of setting the intruding object detection threshold and whereby the intruding object detection threshold can be easily set even in the case where the luminance of the monitor field of view and time zone of the day or the iris of the lens undergoes a change.

According to one aspect of the invention, there is provided a monitoring method for detecting an intruding object within a monitoring field of view by applying the subtraction method to an image obtained from an imaging device, comprising the steps of:

generating a first differential image of luminance values between a first input image from said imaging device and a reference background image stored in a storage device;

binarizing the first differential image using a predetermined binarization threshold value, changing the binarization threshold value until a noise level of a binarized image becomes not greater than a predetermined value and setting, as a first binarization threshold value, a binarization threshold value at which the noise level becomes not greater than the predetermined value; and detecting an intruding object based on the first binarization threshold value.

It is a preferable feature of the invention that the first input image is an image containing no intruding object.

The monitoring method according to the invention preferably further comprises the steps of:

generating a second differential image of luminance values between a second input image containing an intruding object from the imaging device and the background image stored in the storage device;

binarizing the second differential image using a predetermined threshold value, changing the binarization threshold value until a size of the intruding object in a binarized image becomes not greater than a predetermined value and setting, as a second binarization threshold value, a binarization threshold value at which a size of the intruding object in the binarized image becomes not greater than the predetermined value;

setting a third binarization threshold value between the first and second binarization threshold value inclusive of the first and second bianrization threshold values; and detecting an intruding object based on the third binarization threshold value.

According to another aspect of the invention, there is provided a monitoring apparatus for detecting an intruding object within a monitoring field of view by applying the subtraction method to an image obtained from an imaging device, comprising an imaging device which outputs a first input image;

a first storage device which stores a reference background image;

a processing unit which generates a first differential image of luminance values between the first input image and the reference background-image;

a first binarizing unit which binarizes the first differential image using a predetermined binarization threshold value, changes the binarization threshold value until a noise component of the binarized image becomes not greater than a predetermined value and outputs, as a first binarization threshold value, a binarization threshold value at which the noise component of the binarized image becomes not greater than the predetermined value;

a detection unit which detects an intruding object based on the first binarization threshold value.

It is a preferable feature of the invention that the first input image is an image containing no intruding object.

In one embodiment of the invention, the imaging device outputs a second input image containing an intruding object and the monitoring apparatus further comprises:

a processing unit which generates a second differential image of luminance values between the second input image and the reference background image stored in the first storage device;

a second binarizing unit which binarizes the second differential image using a predetermined binarization threshold value, changes the bianrization threshold value until a size of an intruding object in a binarized image becomes not greater than a predetermined value and outputs, as a second binarization threshold value, a binarization threshold value at which the size of the intruding object in the binarized image becomes not greater than the predetermined value; and a threshold value setting unit which sets a third binarization threshold value between the first and second binarization threshold values inclusive of the first and second binarization threshold values, wherein the detection unit detects an intruding object based on the third binarization threshold value.

BRIEF DESCRIPTION OF THE DRAWINGS

The foregoing and other objects, features and advantages of the invention will be apparent from the following more particular description of the preferred embodiments of the invention as illustrated in the accompanying drawings wherein.

DESCRIPTION OF THE EMBODIMENTS

Figure 1:
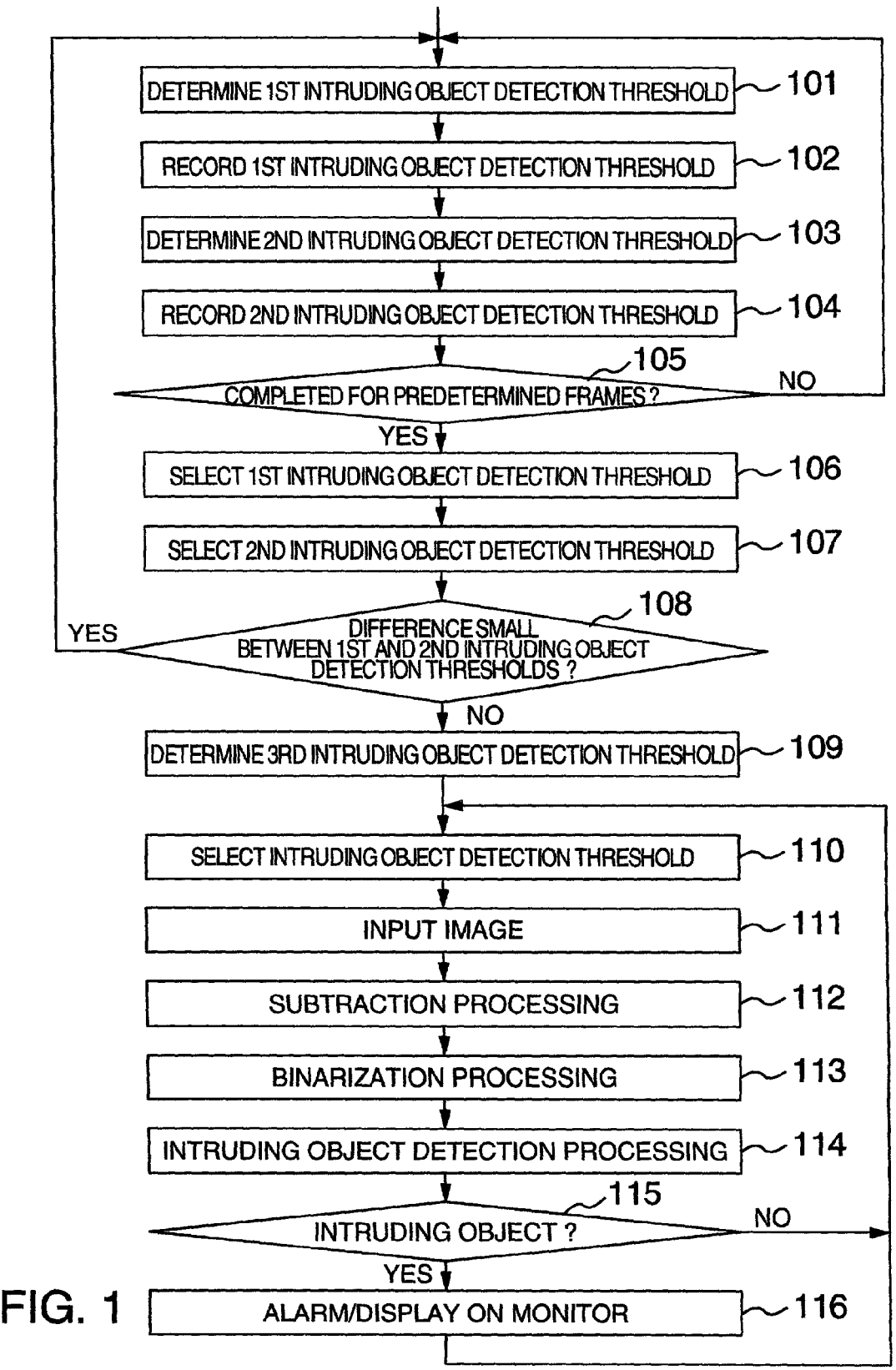
FIG. 1 is a flowchart showing a method of determining an intruding object detection threshold and detecting an intruding object according to an embodiment of the invention.

Embodiments of the present invention will be explained below with reference to the accompanying drawings. In the drawings, similar component parts are designated by similar reference numerals, respectively.

Figure 14:
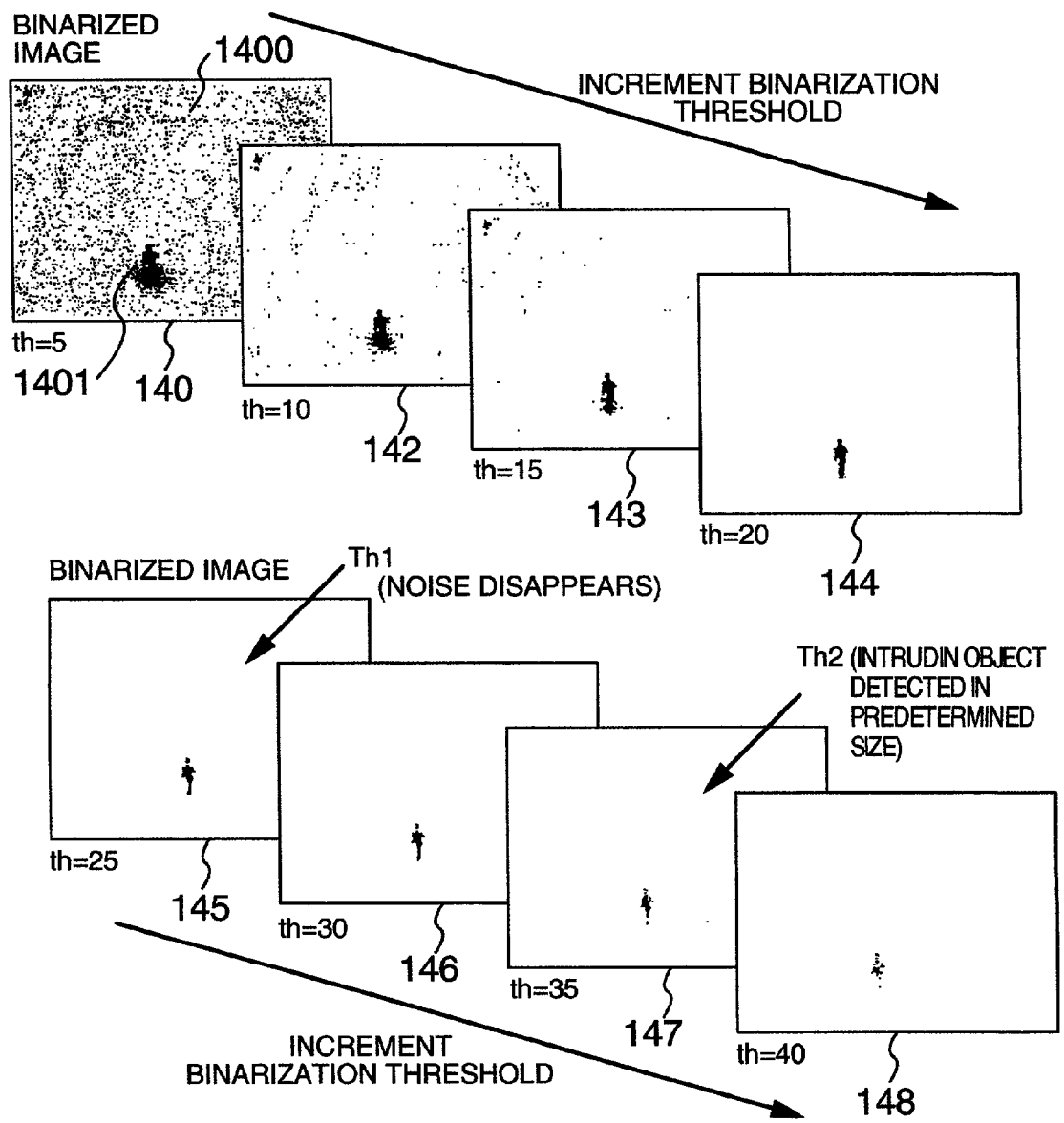
FIG. 14 is a diagram for explaining the operating principle of determining the intruding object detection threshold according to the invention.

FIG. 14 is a diagram showing the change of a binarized image for explaining the process of determining a binarization threshold.

First, the principle of the invention will be explained with reference to FIG. 14.

In FIG. 14, reference numerals 140 to 148 designate binarized images generated based on the difference of the brightness (luminance) value for each pixel between the same input image containing an intruding object (an intruding person in this case) and a reference background image not containing any intruding object, using the binarization thresholds th incremented from 5 to 10 to 15 to 20 to 25 to 30 to 35 to 40, respectively. Numeral 1400 designates a noise image contained in the binarized image 140, and numeral 1401 an image of an intruding object. According as the binarization threshold th is incremented from the initial value of 5 or th=5, the noise image gradually comes to disappear and completely dies out at the binarization threshold of 25 or th=25. Assume that the binarization threshold at this point is a first binarization threshold TH1. Each time the binarization threshold is further incremented, the size of the intruding object is reduced. At the threshold th of 35 or th=35, the intruding object is detected in a predetermined size, and at the threshold th of 40 or th=40, the intruding object is reduced to less than a predetermined size. The binarization threshold th of 35 or th=35 is assumed to be a second binarization threshold TH2. Thus, for removing noises completely and detecting an intruding object without overlooking it, a value between TH1 and TH2 is selected as an intruding object detection threshold. Although the first threshold TH1 was assumed to be the one where the noise comes to be completely removed, a threshold at which a cluster of pixels in not less than a predetermined number may alternatively be used as a first threshold TH1 as described later.

In the foregoing description, the binarization threshold is incremented from the initial value. Nevertheless, the initial value may of course alternatively be set to th=40, for example, from which the threshold is decremented sequentially.

Now, an intruding object monitor apparatus according to an embodiment of the invention will be explained.

Figure 11:
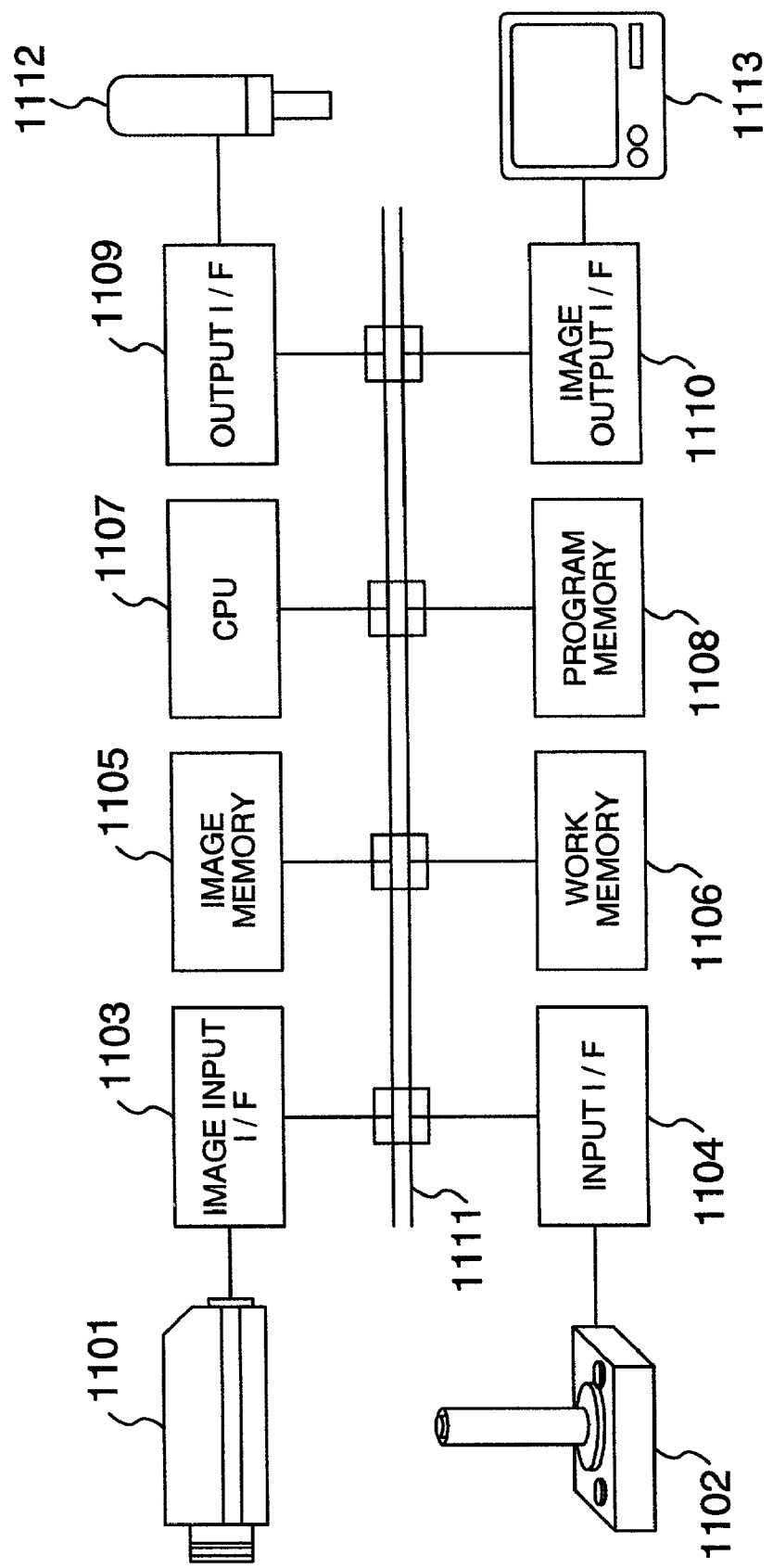
FIG. 11 is a block diagram showing a configuration of an intruding object monitor apparatus according to an embodiment of the invention.

FIG. 11 is a block diagram showing a configuration of an intruding object monitor apparatus according to the invention. Numeral 1101 designates a television (TV) camera, numeral 1102 an input unit, numeral 1103 an image input interface (I/F), numeral 1104 an input I/F, numeral 1105 an image memory, numeral 1106 a work memory, numeral 1107 a CPU (Central Processing Unit), numeral 1108 a program memory, numeral 1109 an output I/F, numeral 1110 an image output I/F, numeral 1112 an alarm lamp, numeral 1113 a monitor and numeral 1111 a data bus.

In FIG. 11, the TV camera 110 is connected to the image input I/F 1103, the input unit 1102 is connected to the input I/F 1104, the alarm lamp 1112 is connected to the output I/F 1109, and the monitor 1113 is connected to the image output I/F 1110. Also, the image input I/F 1103, the input I/F 1104, the image memory 1105, the work memory 1106, the CPU 1107, the program memory 1108, the output I/F 1109 and the image output I/F 1110 are connected to the data bus 1111.

In FIG. 11, the TV camera 1101 picks up an image in the imaging field of view containing the range to be monitored. The TV camera 1101 converts the image picked up into an electrical video signal (such as a NTSC video signal), and applies the converted video signal to the image input I/F 1103.

The image input I/F 1103 converts the input video signal into the image data of the format (for example, width of 320 pixels, height of 240 pixels, 8 bits per pixel) handled in the intruding object monitor apparatus, and applies the converted image data to the image memory 1105 through the data bus 1111.

The image memory 1105 accumulates the image data sent thereto. The input unit 1102 detects a specific motion such as a voice or a gesture of a person or an accompanying animal or at least one input operation of external input units such as the button, the keyboard and the mouse, and converts it into an operation signal (such as a RS-232C serial communication signal). The converted operation signal is applied to the input I/F 1104.

The input I/F 1104 converts the input operation signal into the operation data of a format (for example, "1", "2", "3", "4", "5" representing the operation upward, downward, leftward and rightward, and the operation of depressing the button, respectively) handled by the intruding object monitor apparatus, and applies the converted operation data to the work memory 1106 through the data bus 1111. This format may be RS-232C, for example.

The work memory 1106 accumulates the input operation data. The CPU 1107 analyzes, in the work memory 1106, the images accumulated in the image memory 1105 in accordance with the program stored in the program memory 1108.

As the result of this analysis, information is acquired as to whether an intruding object has intruded into the imaging field of view of the TV camera 1101 or not.

The CPU 1107 applies a video signal through the image output I/F 1110 to the monitor 1112, which displays, for example, a processed image. At the same time, the CPU 1107 applies to the alarm lamp 1112 a control signal for turning on the alarm lamp 1112 through the output I/F 1109. The alarm lamp 1112 is turned on by the control signal input thereto. The image output I/F 1110 converts the video signal from the CPU 1107 to a format usable by the monitor 1113 (the NTSC video signal, for example), and applies it to the monitor 1113. The monitor 1113 displays the image of the result of detection of an intruding object, for example.

Figure 2:
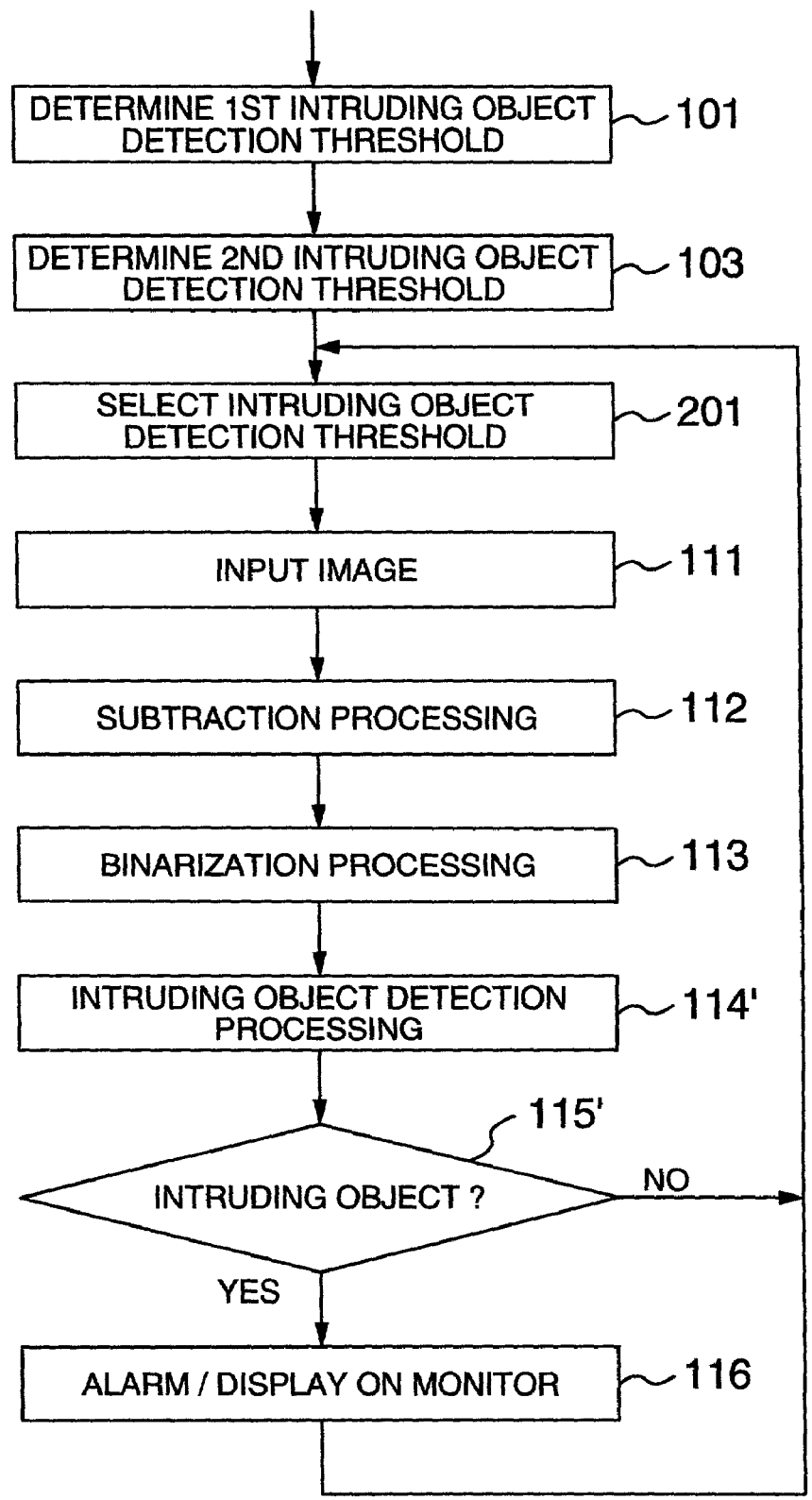
FIG. 2 is a flowchart showing a method of determining an intruding object detection threshold and detecting an intruding object according to another embodiment of the invention.

FIG. 2 shows an example of a flowchart showing the operation of the first embodiment of the invention. This flowchart is executed by use of the intruding object monitor apparatus already described and shown in FIG. 11.

Figure 13:
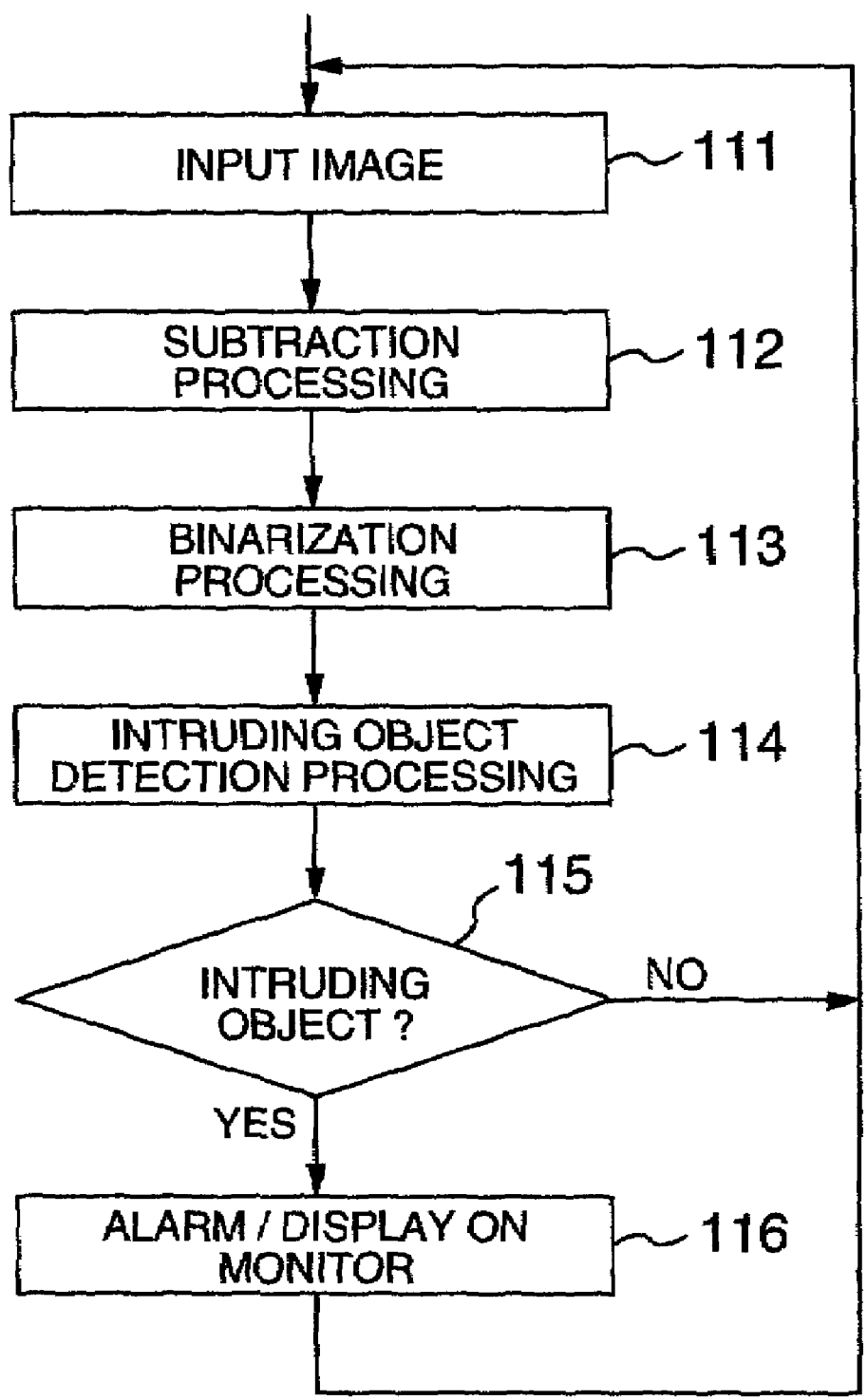
FIG. 13 is a flowchart showing the operation of intruding object detection by the subtraction method.

According to this embodiment, a first intruding object detection threshold determining step 101, a second intruding object detection threshold determining step 103 and an intruding object detection threshold select step 201 are added before the image input step 111 in the flowchart of FIG. 13 for detecting an intruding object.

In the first intruding object detection threshold determining step 101 shown in FIG. 2, an intruding object detection threshold is determined based on the noise level having the pixel value "255" (this is hereinafter called as the number of pixel clusters) detected in the binarized image with the binarization threshold increased for binarizing the difference image. The first intruding object detection threshold determining step 101 will be explained with reference to FIG. 4.

Figure 4:
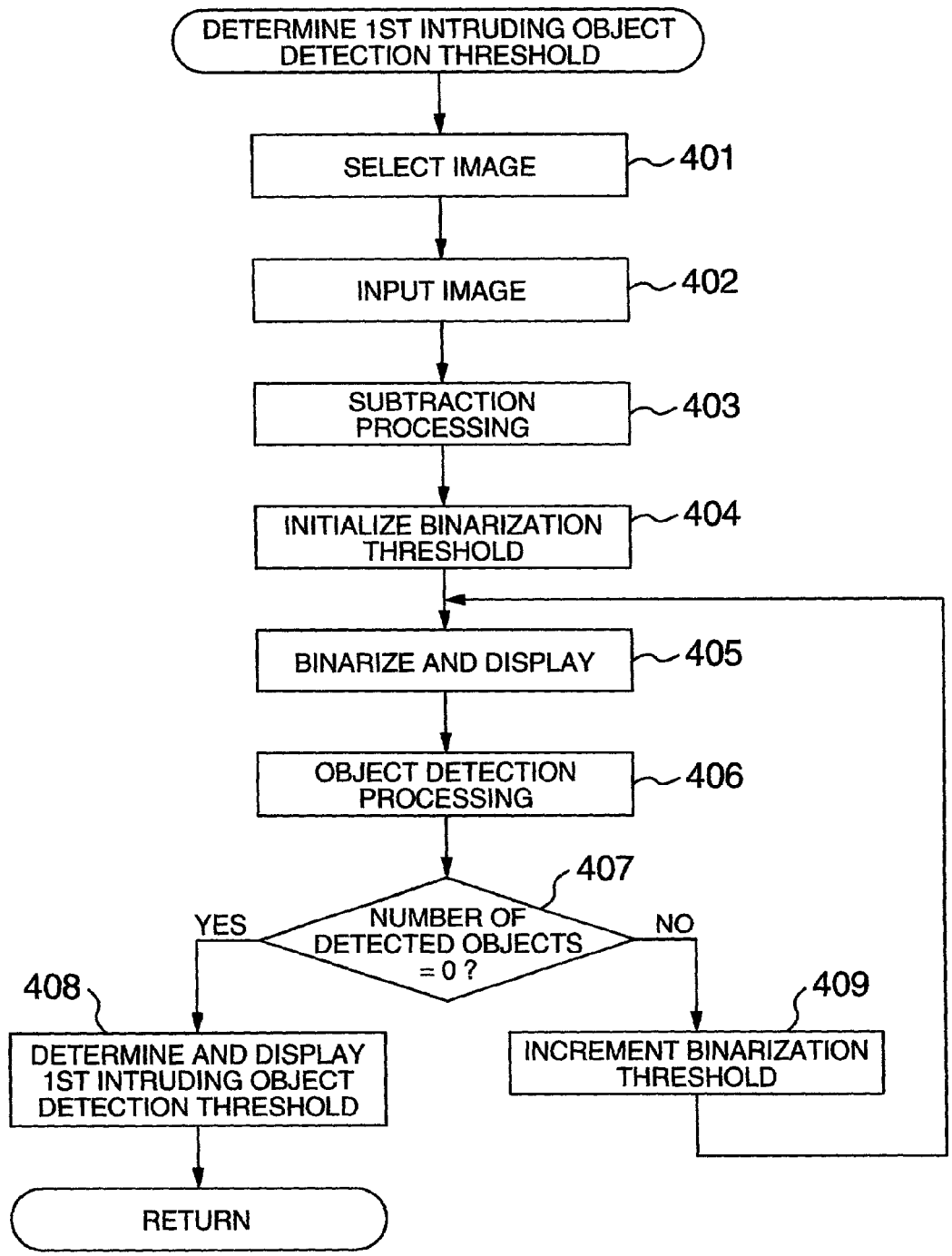
FIG. 4 is a more detailed flowchart showing the step of determining a first intruding object detection threshold according to the embodiment of FIG. 2.

FIG. 4 shows an example of a flowchart for explaining the operation of the first intruding object detection threshold detection step 101 shown in FIG. 2. A reference background image 1202 is in store beforehand in the image memory 1105.

In an image select step 401 of FIG. 4, an image having not any intruding object to be detected in the monitor field of view is selected. In this process, for example, the monitor operator watching the image picked up by the TV camera 1101 displayed on the screen of the monitor 1113 determines whether an intruding object to be detected exists in the monitor field of view, and by operating the input unit 1102, notifies the object monitor apparatus that there is no intruding object to be detected. This notification is regarded to indicate that a proper image has been selected, and the process proceeds to an image input step 402.

In the image input step 402, like in the image input step 111, an input image having, say, a width of 320 pixels, a height of 240 pixels and 8 bits per pixel is acquired.

Figure 12:
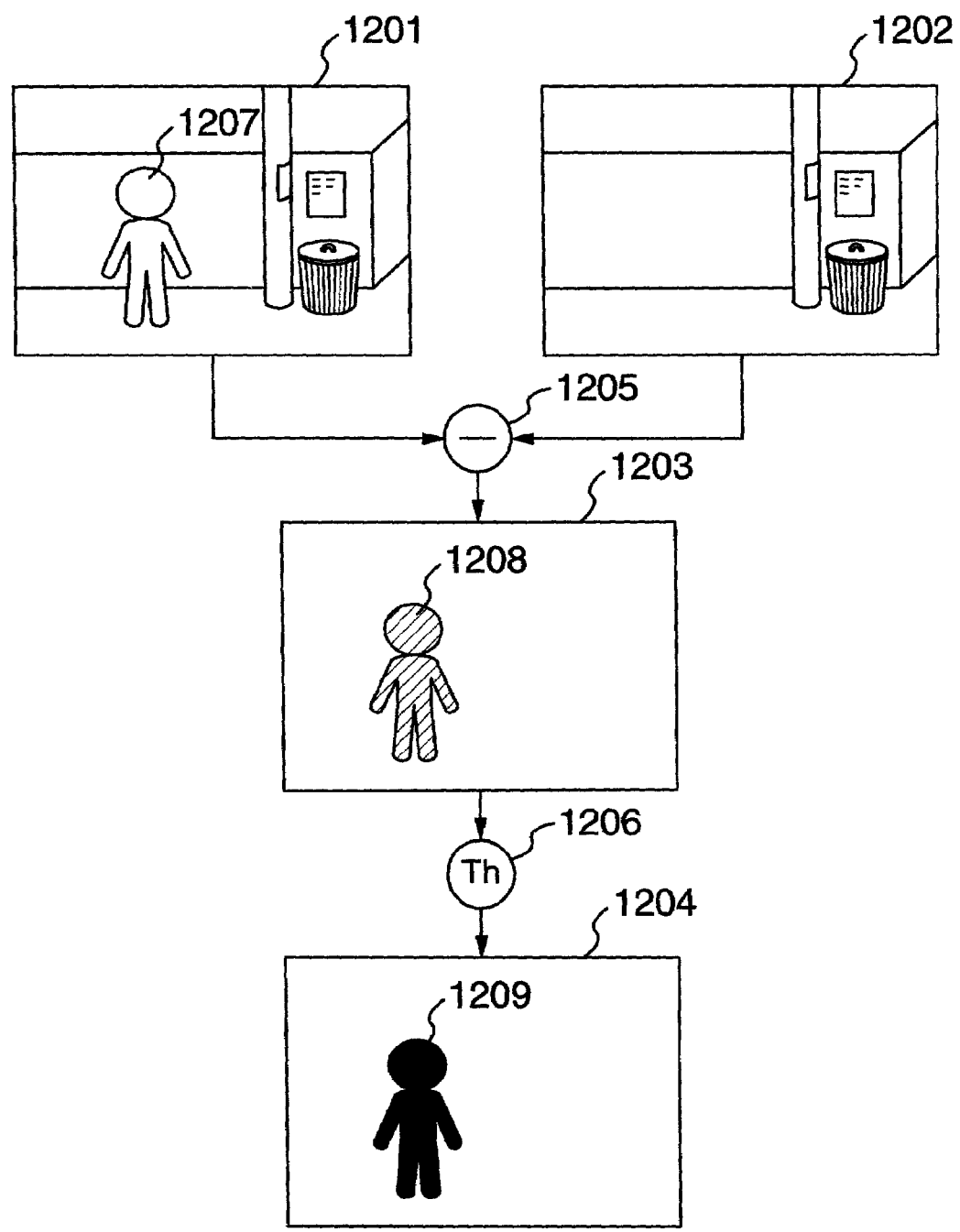
FIG. 12 is a diagram for explaining the principle of detecting an intruding object by the subtraction method.

In the subtraction processing step 403, like in the subtraction processing step 112, the difference between the input image 1201 and the reference background image 1202 for each pixel is determined thereby to acquire a difference image 1203 (FIG. 12).

In a binarization threshold initialization step 404, the binarization threshold Th is initialized to 1 or Th=1, for example.

In a binarization processing and display step 405, the difference image 1203 obtained in the subtraction processing step 403 is binarized based on the prevailing binarization threshold Th. Then, in the difference image 1203, the pixels having a pixel value not less than the binarization threshold Th are defined as "255", while the pixels of a value less than the binarization threshold Th are defined as "0" thereby to acquire the binarized image 1204.

Also, the binarization threshold and the binarized image acquired in the process are displayed on the screen of the monitor 1113 (described in detail later).

Then, in an object detection processing step 406, clusters of the pixels having the pixel value "255" (corresponding to the noise level) in the binarized image 1204 are detected and the number of the clusters is counted.

For example, the number of the pixel clusters having not less than a predetermined area (10 pixels, for example) is counted.

In the case where the number of the objects to be detected which have been detected in the object detection processing step 406 is 0, the process proceeds from the detection object number determining step 407 to the first intruding object detection threshold determining and display step 408, while in the case where the number of the objects to be detected is not less than unity, on the other hand, the process proceeds to a binarization threshold increment step 409.

In the first intruding object detection threshold determining and display step 408, the value of the binarization threshold Th used in the binarization processing step 405 is determined as the first intruding object detection threshold TH1, and as described later, a first threshold candidate mark 806*a* is displayed on the monitor 1113, so that upon complete execution of the first intruding object threshold determining step 101, the process proceeds to the second intruding object detection threshold determining step 103.

In the binarization threshold increment step 409, the binarization threshold is incremented by one, and then the process proceeds to the binarization processing step 405.

In the foregoing description, an image having no intruding object to be detected in the monitor field of view is selected in the image select step 401. Nevertheless, an image having one or more intruding objects may alternatively be selected. In such a case, the process proceeds from the detected object number determining step 407 to the first intruding object detection threshold determining and display step 408 in the case where the number of the objects detected in the object detection processing step 406 is equal to the number of the intruding objects displayed in the selected image.

The binarization threshold Th, though initialized to 1 or Th=1 in the binarization threshold initialization step 404, may be initialized to any other value in accordance with the conditions of the monitor field of view. Further, the binarization threshold, which is incremented by 1 in the binarization threshold increment step 409, can obviously be incremented alternatively to any value other than 1. Also, the binarization threshold can be increased in an arithmetic progression, in a geometric progression or randomly.

In the second intruding object detection threshold determining step 103, the intruding object detection threshold is determined in accordance with the change in the size of the pixel cluster having the pixel value of "255" detected in the binarized image with the binarization threshold increased for binarizing the difference image. The second intruding object detection threshold determining step 103 will be explained with reference to FIG. 5.

Figure 5:
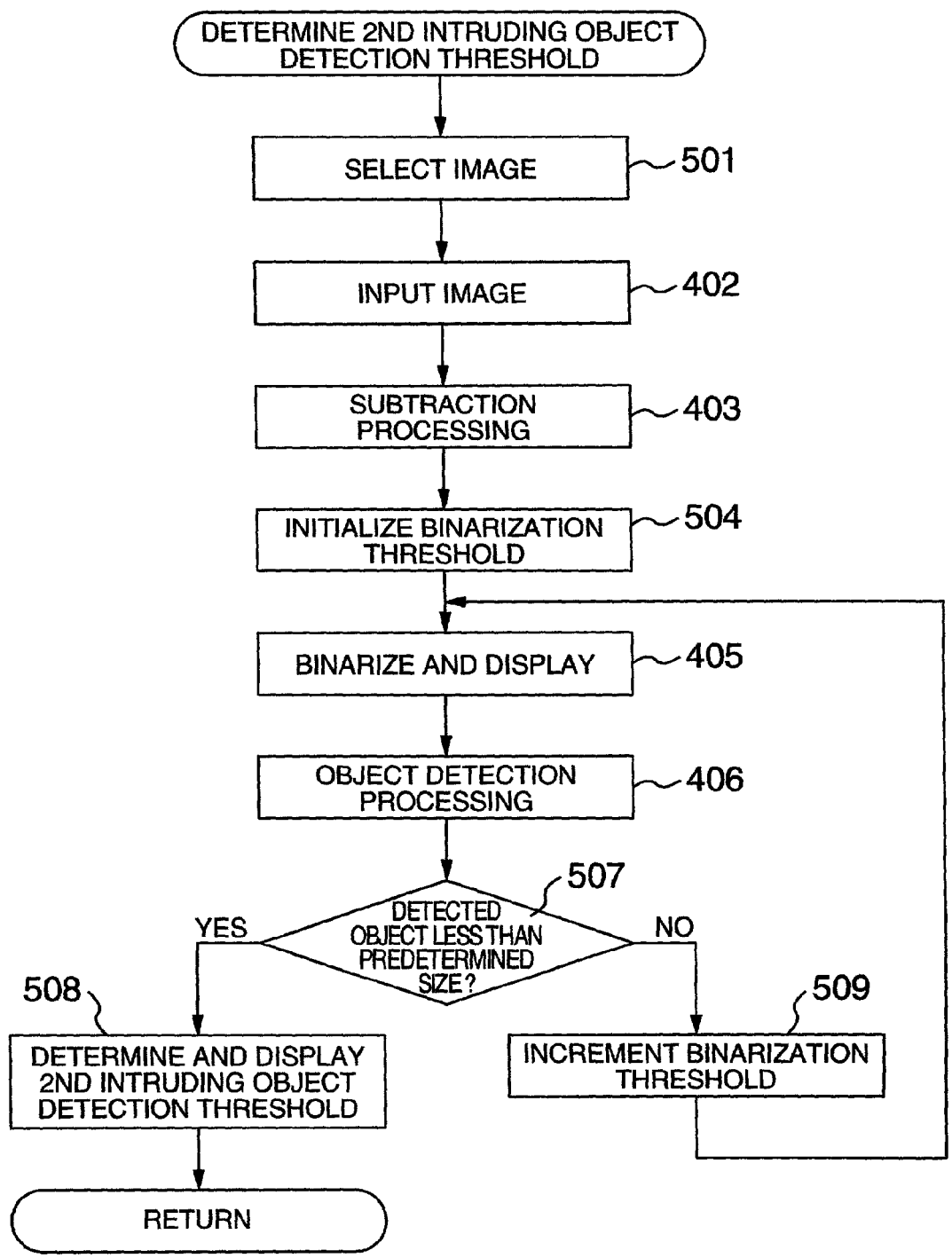
FIG. 5 is a more detailed flowchart showing the step of determining a second intruding object detection threshold according to the embodiment of FIG. 2.

FIG. 5 is an example of a flowchart for explaining the operation of the second intruding object detection threshold determining step 103 shown in FIG. 2. The flowchart of FIG. 5 includes an image select step 501, a binarization threshold initialization step 504, a detected object size determining step 507, a second intruding object detection threshold determining and display step 508 and a binarization threshold increment step 509 in place of the the image select step 401, the binarization threshold initialization step 404, the detected object number determining step 407, the first intruding object detection threshold determining and display step 408 and the binarization threshold increment step 409, respectively. The other steps are similar to the corresponding steps in FIG. 4 and therefore will not be described.

In the image select step 501 in FIG. 5, an image is selected which contains a reference intruding object providing a reference for determining the intruding object detection threshold in the monitor field of view. The reference intruding object is a person in the case where the intruding object monitor apparatus is used for monitoring an intruding person, and a vehicle in the case where the monitor apparatus is used for monitoring a vehicle. In this process, like in the case of FIG. 4, the monitor operator determines whether a reference intruding object is contained in the monitor field of view, and using the input unit 1102, notifies the intruding object monitor apparatus that the reference intruding object is displayed. According to this notification, assume that an appropriate image is selected. Then, the image input step 402 and the subtraction processing step 403 are executed, followed by proceeding to step 504.

In the binarization threshold initialization step 504, the binarization threshold is initialized, for example, to the first intruding object detection threshold TH1, and then the binarization processing and display step 405 and the object detection processing step 406 are executed, followed by proceeding to step 507.

In the detected object size determining step 507, it is determined whether the size of the rectangle circumscribed about the largest detected object is less than a predetermined value or not. The predetermined value is defined as the critical size for regarding a given object as an intruding object to be detected. In the case where the imaging device used for monitoring is a ½ inch-type CCD (width x=6.5 mm, height dy=4.6 mm), the lens has f of 25 mm, the distance L from the camera to the monitor area is 50 m, the input image has a width X0 of 320 pixels and a height Y0 of 240 pixels, for example, the following equation (1) is established assuming that the intruding object to be detected has a width w0 of 1 m and a height h0 of 1.5 m.

$$\left. \begin{array}{l} W0 = \dfrac{f}{dx \times L} \times w0 \times X0 \cong 25[pix] \\ H0 = \dfrac{f}{dy \times L} \times h0 \times Y0 \cong 39[pix] \end{array} \right\} \quad (1)$$

In the case where the size of the rectangle circumscribed about the detected object is given as w≦W0 and h≦H0 (W: width, H: height), it is determined that the size of the rectangle circumscribed about the largest detected object is smaller than the predetermined value.

In the case where it is determined in the detected object size determining step 507 that the size of the rectangle circumscribed about the largest detected object is smaller than a predetermined value, the process proceeds to the second intruding object detection threshold determining and display step 508. In the case where the size of the rectangle circumscribed about the largest detected object is not less than the predetermined value, on the other hand, the process proceeds to the binarization threshold increment step 509.

In the second intruding object detection threshold determining and display step 508, the binarization threshold Th used in the binarization processing and display step 405 less 1 (the binarization threshold immediately before the binarization threshold Th, i.e. the binarization threshold less the increment in the binarization threshold increment step 509) is determined as a second intruding object detection threshold TH2. Further, as described later, a second threshold candidate mark 807a representing the second intruding object detection threshold thus determined is displayed on the monitor 1113 (FIG. 8), and the second intruding object detection threshold determining step 103 of FIG. 2 is completed, followed by proceeding to the intruding object detection threshold select step 201.

In the binarization threshold increment step 509, the binarization threshold is incremented by 1, followed by proceeding to the binarization processing step 405.

In the foregoing description, the binarization threshold is incremented in steps of 1, to which the invention is not limited, but the size of each step may be not less than 2, or as described above, may be increased in an arithmetic progression, in a geometric progression or randomly.

In the intruding object detection threshold select step 201 of FIG. 2, a threshold between the first intruding object detection threshold TH1 and the second intruding object detection threshold TH2 obtained in the first intruding object detection threshold determining step 101 and the second intruding object detection threshold determining step 103, respectively, is determined as an intruding object detection threshold. That is, the intruding object detection threshold Th is determined as follows.

$$TH1 \leq Th \leq Th2 \quad (2)$$

This process is carried out by selecting a threshold between the first intruding object detection threshold TH1 and the second intruding object detection threshold TH2 using the input unit 1102 in response to the operation of the input unit 1102 by the monitor operator.

Incidentally, the step of determining a threshold value Th3 (average value, for example) between the first intruding object detection threshold Th1 and the second intruding object detection threshold TH2 may be inserted before the intruding object detection threshold determining step 103, so that one of the intruding object detection thresholds TH1, TH2 and Th3 may be selected in step 201.

Figure 10:
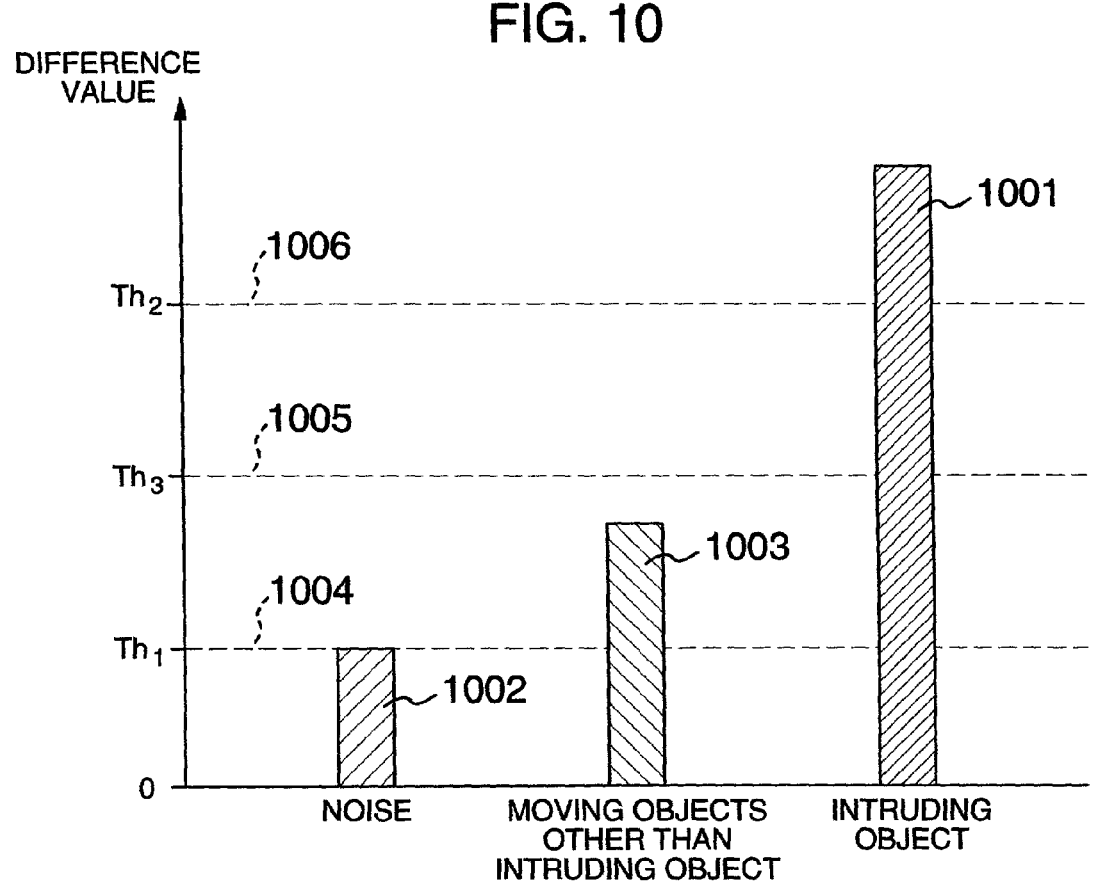
FIG. 10 is a diagram showing each difference level of an intruding object to be detected, noise and other moving objects than the intruding object.

The relation between the first intruding object detection threshold TH1 and the second intruding object detection threshold TH2 will now be explained with reference to FIG. 10. FIG. 10 shows the relation between the level 1002 of the difference of the noise (the noise generated in the imaging device and the noise superposed during the transmission of the video signal) and the level 1001 of the difference of the intruding object (the moving objects other than the intruding object will be described later) detected by the subtraction method.

As shown in FIG. 10, the first intruding object detection threshold TH1 is determined using the image not containing the intruding object to be detected (or using the image containing one or more intruding objects, as described earlier) in the first intruding object detection threshold determining step 101. Therefore, the noise difference level 1002 is less than the first intruding object detection threshold 1004 (TH1). Also, the critical binarization threshold that the reference intruding object can be detected is determined as the second intruding object detection threshold TH2 in the second intruding object detection threshold determining step 102, and therefore the difference level 1001 of the intruding object is larger than the second intruding object detection threshold 1006 (Th2).

Specifically, the intruding object detection threshold capable of preventing the erroneous detection of noises and capable of detecting an intruding object can be set by selecting one of the first intruding object detection threshold TH1 and the second intruding object detection threshold TH2 as an intruding object detection threshold.

Returning to FIG. 2, in the image input step 111 following step 201, an input image having a width of 320 pixels, a height of 240 pixels, 8 bits per pixel, for example, is acquired from the TV camera 1101, and the process proceeds to step 112.

In the subtraction processing step 112, the difference between the input image and the reference background image is determined for each pixel thereby to acquire a difference image, and the process proceeds to step 113.

In the binarization processing step 113, the difference image acquired is processed to acquire a binarized image by defining the pixels not less than the intruding object detection threshold as "255" and the pixels less than the intruding object threshold as "0" based on the intruding object detection threshold selected in step 201, followed by proceeding to step 114'.

In the intruding object detection processing step 114', a cluster of the pixels having the value of "255" in the binarized image is detected by the well-known labelling method, for example, and the process proceeds to step 115'.

In the intruding object determining step 115', assuming that the size of the intruding object detected in the intruding object detection processing step 114' is not less than a predetermined value, for example, an intruding object is regarded to have been detected, and the process proceeds to step 116. In the case where the size of the rectangles circumscribed about all the detected intruding objects is less than the predetermined value, on the other hand, an intruding object is regarded not to have been detected, and the process returns to the image input step 111. The predetermined value is calculated by equation (1) described above.

In the alarm/monitor display step 116, the processing result is displayed on the monitor 1113 through, for example, the image output I/F 1110 or the alarm lamp 1112 is turned on through the output I/F 1109.

According to this embodiment, therefore, the first intruding object detection threshold TH1 and the second intruding object detection threshold TH2 are determined from the input images obtained by the imaging device, and by selecting a threshold between them, an intruding object detection threshold can be easily set, thereby making it possible to detect an intruding object easily in the field of view of the imaging device.

Figure 3:
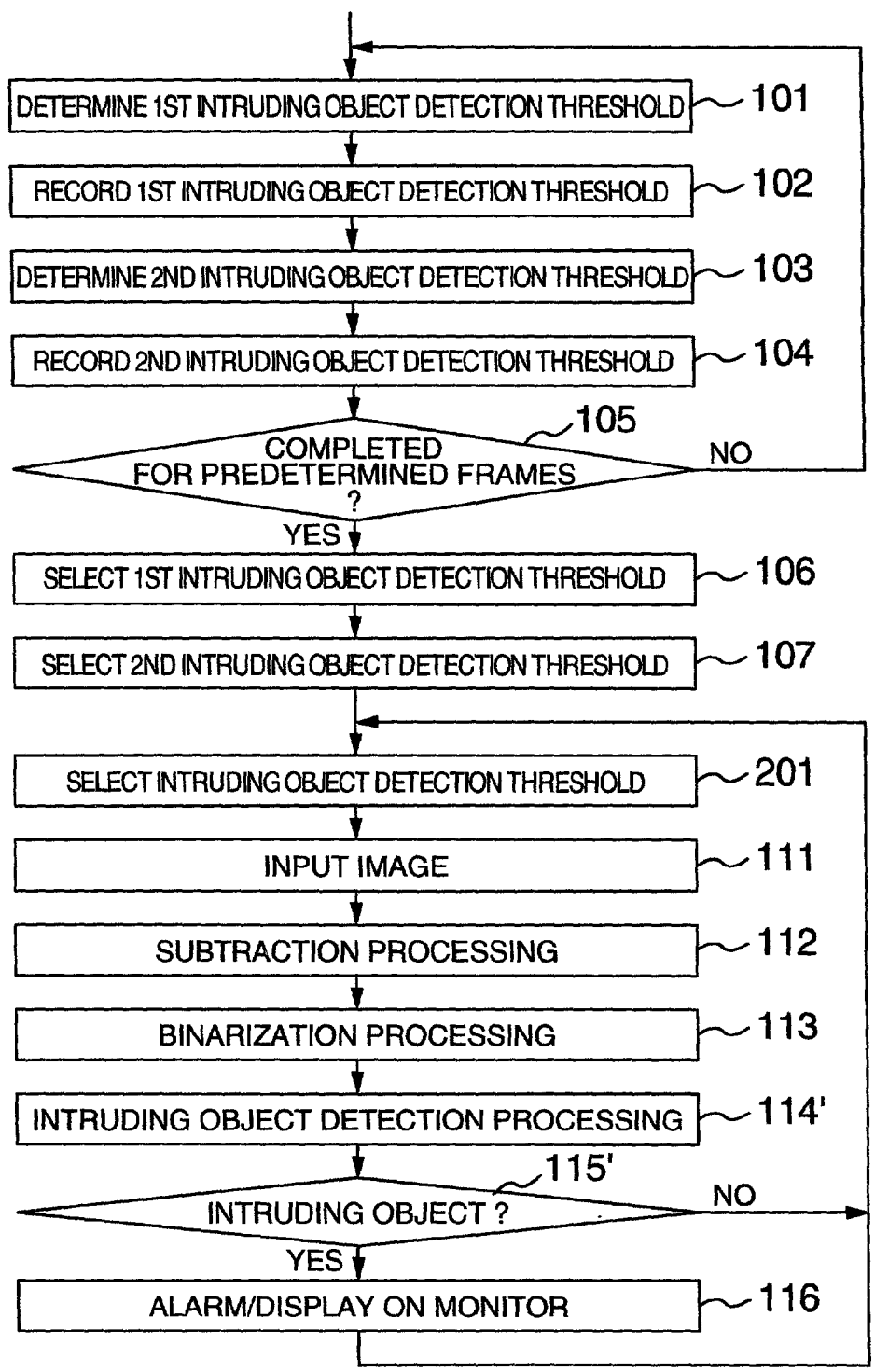
FIG. 3 is a flowchart showing a method of determining an intruding object detection threshold and detecting an intruding object according to still another embodiment of the invention.

FIG. 3 is an example of a flowchart showing the processing operation according to a second embodiment of the invention. According to this second embodiment, at least one candidate for each of the first intruding object detection threshold and the second intruding object detection threshold is recorded, and based on each candidate, the first intruding object detection threshold and the second intruding object detection threshold are determined.

In addition to the steps included in the flowchart of FIG. 2, the flowchart of FIG. 3 includes step 102 for recording the first intruding object detection threshold, step 104 for recording the second intruding object detection threshold, step 105 for determining the end of a predetermined frame, step 106 for selecting the first intruding object detection threshold, and step 107 for selecting the second intruding object detection threshold. The remaining steps are similar to the corresponding steps in the flowchart shown in FIG. 2, and therefore will not be described.

In FIG. 3, as described with reference to FIG. 2, the process of the first intruding object detection threshold determining step 101 is executed, followed by proceeding to step 102.

In the first intruding object threshold recording step 102, the first intruding object detection threshold TH1 obtained in the first intruding object detection threshold determining step 101 is recorded in the work memory 1106 as a candidate for the first intruding object detection threshold.

Similarly, as explained with reference to FIG. 2, the second intruding object detection threshold determining step 103 is executed and the process proceeds to step 104.

In the second intruding object detection threshold recording step 104, the second intruding object detection threshold TH2 obtained in the second intruding object detection threshold determining step 103 is recorded in the work memory 1106 as a candidate for the second intruding object detection threshold.

Then, in the predetermined frame end determining step 105, it is determined whether the candidates for each intruding object detection threshold for a predetermined number of frames are obtained or not, and in the case where the candidates for the predetermined number (say, 5) of frames are obtained, the process proceeds to the first intruding object detection threshold select step 106, while in the case where such candidates for the predetermined number-of frames are not obtained, on the other hand, the process proceeds to the first intruding object detection threshold recording step 101.

In the first intruding object detection threshold select step 106, the largest value of the candidates for the first intruding object detection threshold recorded in the work memory 1106 is selected as a first intruding object detection threshold.

In the second intruding object detection threshold select step 107, on the other hand, the smallest value of the candidates for the second intruding object detection threshold recorded in the work memory 1106 is selected as a second intruding object detection threshold.

In this way, according to this embodiment, the largest value among the acquired candidates for the first intruding object detection threshold is used as a first intruding object detection threshold, and therefore noises can always be removed (even the highest difference level of noises can be removed). In addition, the smallest value among the acquired candidates for the second intruding object detection threshold is used as a second intruding object detection threshold, and therefore noises can always be removed (even the lowest difference level of an intruding object can be removed). The reliability of the intruding object recognition apparatus can thus be improved.

This embodiment may be modified so that a plurality of candidates are prepared for only one of the first and second intruding object detection thresholds and the threshold for the other may be determined without preparing candidates as in FIG. 2.

Figure 6:
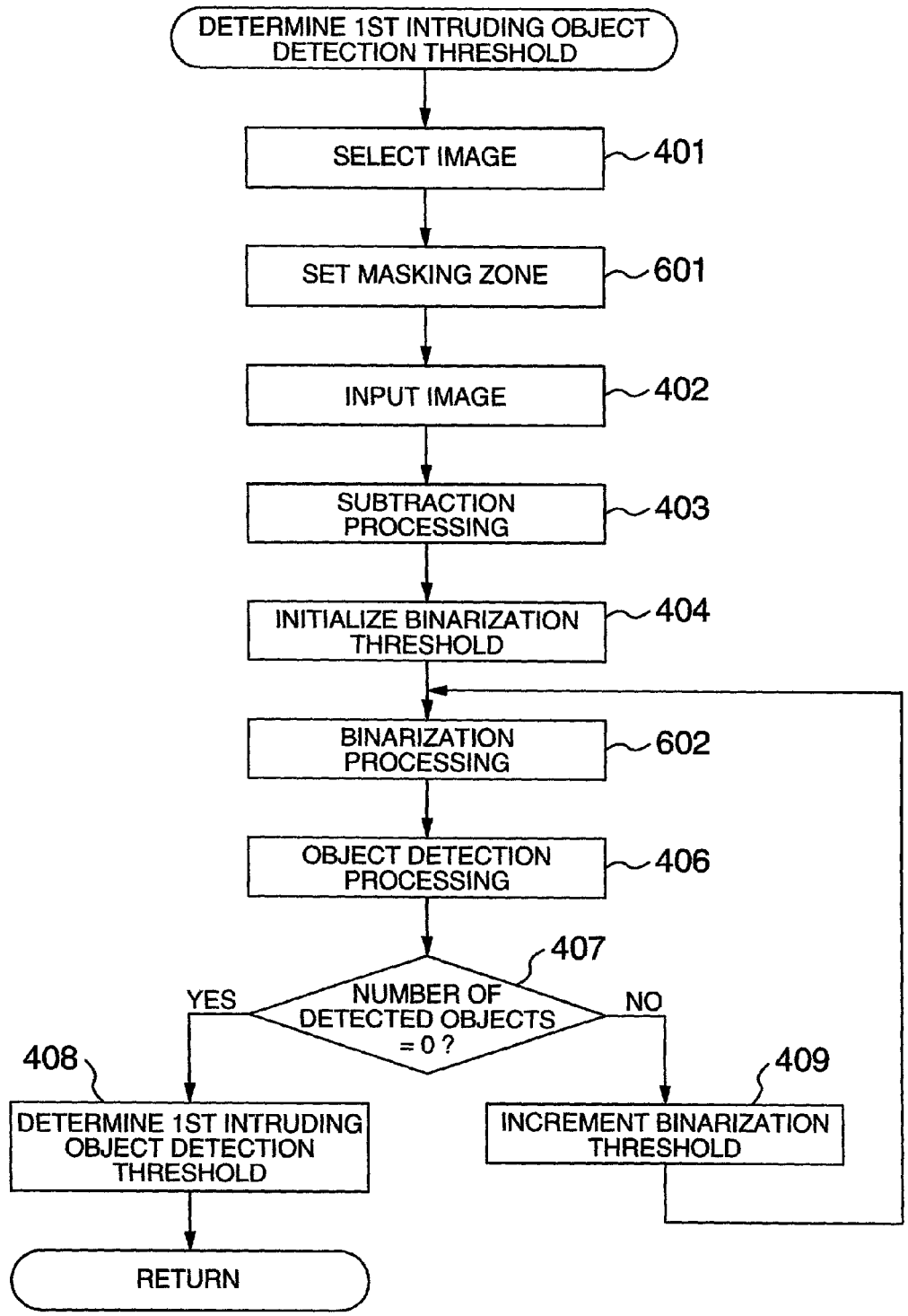
FIG. 6 is a flowchart showing a method of determining a first intruding object detection threshold including the step of setting a masking zone according to an embodiment of the invention.
Figure 7:
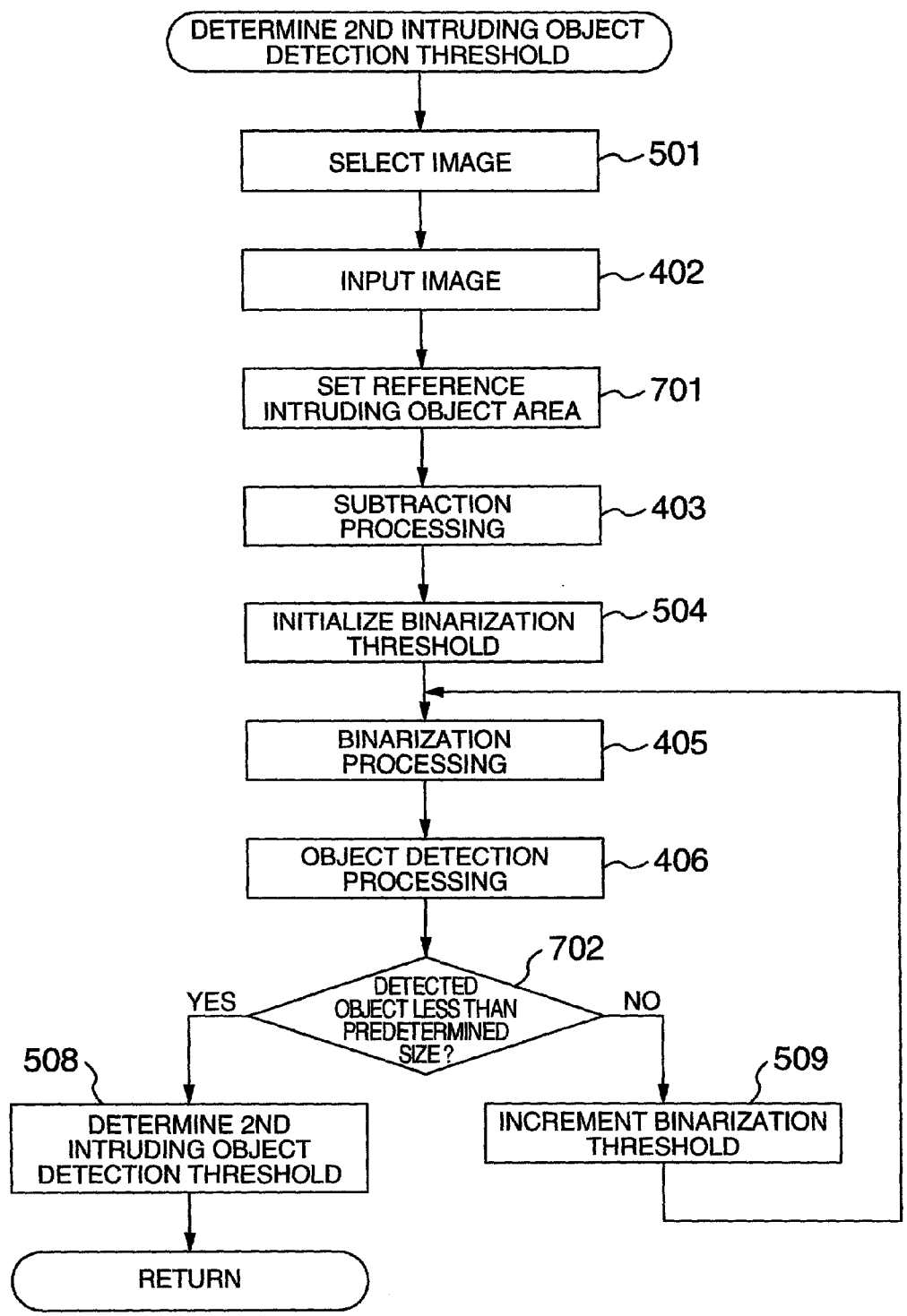
FIG. 7 is a flowchart showing a method of determining a second intruding object detection threshold including the step of setting a reference intruding object area according to an embodiment of the invention.

FIGS. 6 and 7 show an example of flowcharts according to a third embodiment of the invention. According to the third embodiment, a masking zone is set in determining the first intruding object detection threshold, and an area having an intruding object is designated in determining the second intruding object detection threshold. For example, the process of the first intruding object detection threshold determining step 101 shown in FIG. 2 is executed according to the flowchart of FIG. 6, and the process of the second intruding object detection threshold determining step 103 shown in FIG. 2 is executed according to the flowchart of FIG. 7.

FIG. 6 is a flowchart which includes, in addition to the steps of the flowchart shown in FIG. 4, a masking zone setting step 601 inserted between steps 401 and 402, and another binarization processing step 602 in place of the binarization processing step 405.

FIG. 7 is a flowchart which includes, in addition to the steps of the flowchart shown in FIG. 5, a reference intruding object area setting step 701 inserted between steps 402 and 403, and another detected object size determining step 702 in place of the detected object size determining step 507.

In FIG. 6, as described with reference to FIG. 4, the process of the image select step 401 is executed, and the process proceeds to step 601.

Figure 9:
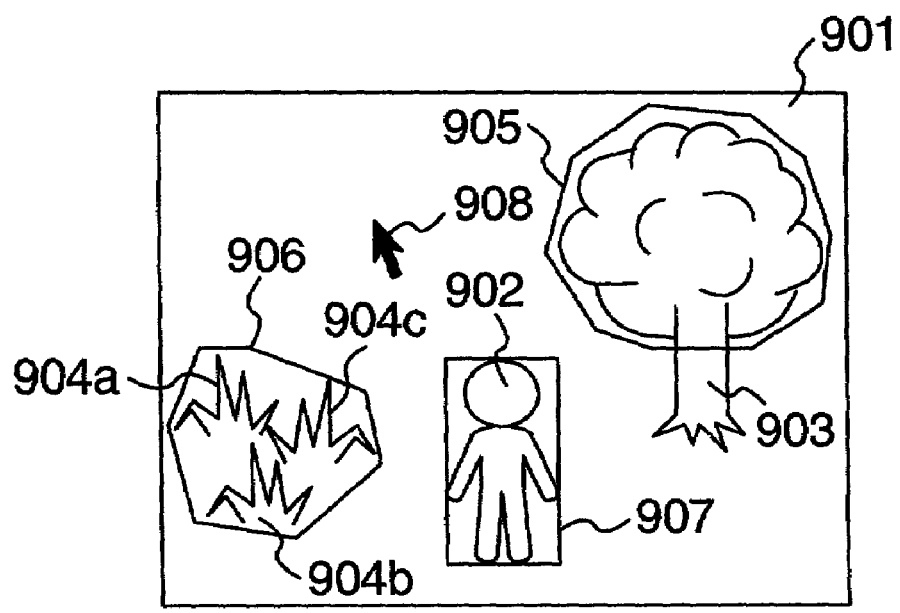
FIG. 9 is a diagram for explaining the method of setting the masking zone and the reference intruding object area according to the embodiments of FIGS. 6 and 7.

In the masking zone setting step 601, moving objects such as a nodding tree other than an intruding object are set as a masking zone to assure more accurate detection of the noise difference level. This process will be explained with reference to FIG. 9. FIG. 9 shows an example in which the input image 901 contains a tree 903 and grass 904a, 904b, 904c.

The monitor operator moves the position indication mark 908 displayed on the monitor 1113 by operating the input unit 1102, and designates a tree area 905 and a grass area 906 by a polygon, for example. The designated areas constitute a masking zone, the pixels of which are not used for determining the first intruding object detection threshold.

Then, the processing operation of steps 402 to 403 is performed, and the process proceeds to step 602.

In the binarization processing step 602, a binarized image is produced which has pixels of "255" with the difference value not less than the binarization threshold and which represents no masking zone, and pixels of "0" for the other parts of the binarized image.

Moving objects such as a nodding tree other than the intruding object to be detected, as shown in FIG. 10, have a larger difference level than the noise difference level. Thus, the provision of the masking zone makes it possible to detect a more accurate noise difference level.

Then, in FIG. 7, the process of the image select step 501 and the image input step 402 is executed, followed by proceeding to step 701, as explained with reference to FIG. 5.

In the reference intruding object area setting step 701, an area (circumscribed rectangle) of the reference intruding object is designated. This will be explained with reference to FIG. 9.

In FIG. 9, an input image 901 contains a reference intruding object 902. The monitor operator moves the position indication mark 908 displayed on the monitor 1113 by operating the input unit 1102, and designates the area 907 of the reference intruding object by a rectangle, for example. The area of the reference intruding object is not limited to a circumscribed rectangle, but obviously can include an arbitrary circumscribed figure. The processing steps 403 to 406 are executed, and the process proceeds to step 702.

In the detected object size determining step 702, the process proceeds to the second intruding object detection threshold determining step 508 in the case where the size of the object detected in the reference intruding object area 907 designated by the reference intruding object area setting step 701 is less than a predetermined ratio of the reference intruding object area 907, and the process proceeds to the binarization threshold increment step 509 in the case where the size of the objected so detected is not less than the predetermined ratio.

The predetermined ratio is 0.3, for example. In other words, an object which has a size not less than 30% of the reference intruding object can be detected as an intruding object.

In this way, according to this embodiment, the first intruding object detection threshold can be obtained by accurately detecting the difference level of the noises superposed on the input image. Further, according to this embodiment, the second intruding object detection threshold can be acquired without calculating the size of the intruding object unlike in the first embodiment, thereby improving the reliability of the intruding object recognition apparatus.

Furthermore, according to this embodiment, a unique effect is achieved by designating an area of an intruding object and determining the second intruding object detection threshold within the particular area, as will be understood from the following explanation. In the subtraction method, a pixel, if any, of an intruding object has a brightness approximate to the reference background image, the particular pixel is determined as "0" by the binarization processing. Some intruding objects, therefore, may be desirably observed as a plurality of separate entities. In such a case, the circumscribed rectangle of the detected object is apparently reduced in size, with the result that the second intruding object detection threshold determined in the first embodiment comes to be smaller than the optimum value. According to this embodiment, an area where an intruding object exists is designated in the reference intruding object area setting step 701, and in the detected object size determining step 702, it is determined whether the pixels of the object detected (a cluster of pixels having a level of "255" as the result of the binarization processing) in the designated area represent not less than a predetermined ratio. The ratio of the pixels assuming "255" in the binarized image is used for determination, and therefore the second intruding object detection threshold determined can assure the detection of an intruding object with pixels in not less than a predetermined ratio regardless of whether the cluster is measured as a plurality of separate entities or not.

FIG. 1 shows an example of a flowchart according to a fourth embodiment. According to the fourth embodiment, the difference is determined between the first intruding object detection threshold TH1 and the second intruding object detection threshold TH2 to judge whether or not the intruding object detection threshold obtained is suitable for the intruding object detection processing.

The flowchart of FIG. 1, in addition to the steps of the flowchart shown in FIG. 3, includes, after the second intruding object detection threshold select step 107, step 108 for determining the difference between the first and second intruding object detection thresholds and step 109 for determining a third intruding object detection threshold, and another intruding object detection threshold select step 110 in place of the intruding object detection threshold select step 201.

In step 108 for determining the difference between the first and second intruding object detection thresholds, the difference is determined between the first intruding object detection threshold TH1 and the second intruding object detection threshold TH2 obtained in the first intruding object detection threshold select step 106 and the second intruding object detection threshold select step 107, respectively, and in the case where the difference is less than a predetermined value (say, 5), the process proceeds to the first intruding object detection threshold determining step 101. Otherwise, the process proceeds to the third intruding object detection threshold determining step 109.

According to this embodiment, in the case where the difference between the first intruding object detection threshold TH1 and the second intruding object detection threshold TH2 is less than a predetermined value in the first and second intruding object detection threshold difference determining step 108, the process proceeds to the first intruding object detection threshold determining step 101, as described above. As an alternative, however, in the case where the process fails to proceed to the third intruding object detection threshold determining step 109 after several repeated sessions of execution of the first and second intruding object detection threshold difference determining step 108, the process may proceed to the alarm/monitor display step 116, for example, to inform the monitor operator of the abnormality.

In the third intruding object detection threshold determining step 109, at least one third intruding object detection threshold Th3 is determined which is larger than the first intruding object detection threshold TH1 and smaller than the second intruding object detection threshold TH2.

In the case where one third intruding object detection threshold Th3 is determined, for example, it may be an average of the first intruding object detection threshold TH1 and the second intruding object detection threshold TH2.

Then, in the intruding object detection threshold select step 110, selected one of the first intruding object detection threshold TH1, the second intruding object detection threshold TH2 and the third intruding object detection threshold Th3 is determined as an intruding object detection threshold.

With reference to FIG. 10, this process is performed by the monitor operator selecting one of the first intruding object detection threshold Th1, the second intruding object detection threshold TH2 and the third intruding object detection threshold Th3 by use of the input unit 1102.

In this way, according to this embodiment, even in the case where the wind velocity changes so that the apparent amount of motion of the object 1003 such as a nodding tree other than the intruding object to be detected contained in the input image undergoes a change, the monitor operator can easily set an appropriate one of the first intruding object detection threshold TH1, the second intruding object detection threshold TH2 and the third intruding object detection threshold Th3 by operating the input unit 1102.

Figure 8:
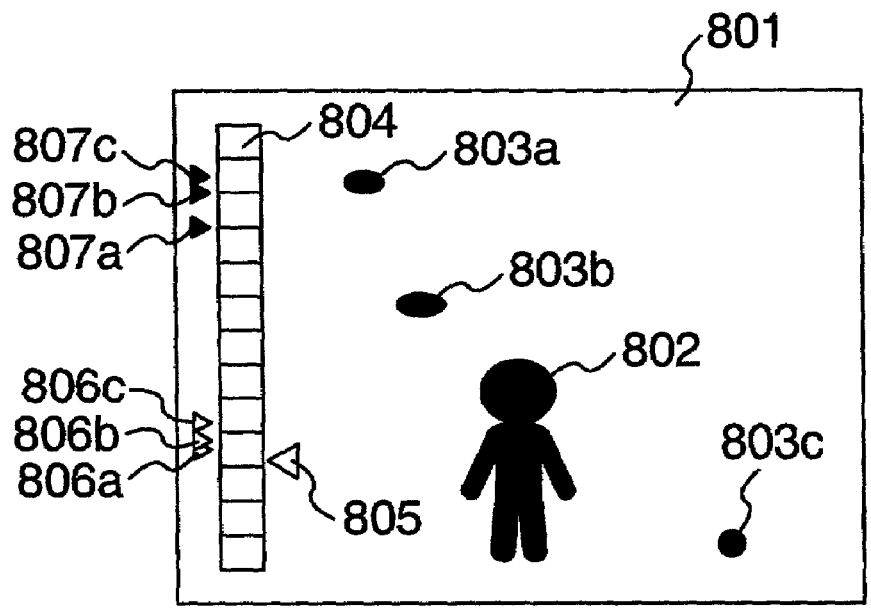
FIG. 8 is a diagram showing a screen of a monitor according to an embodiment of the invention.

FIG. 8 shows the screen displayed on the monitor 1113 according to an embodiment. Specifically, FIG. 8 shows the manner in which the binarized image changes with the binarization threshold and specific values of the candidates for the first intruding object detection threshold and the second intruding object detection threshold. Thus, a binarized image 801 (a reference intruding object 802, noises 803a, 803b, 803c), a binarization threshold level gauge 804, an identification mark (binarization threshold mark) 805 indicating the position of the prevailing binarization threshold on on the binarization threshold level gauge, candidate marks 806a, 806b, 806c of the first intruding object detection threshold and candidate marks 807a, 807b, 807c of the second intruding object detection threshold.

In FIG. 8, assume that the intruding object monitor apparatus is activated, and the processing operation of the flowchart shown in FIG. 4 is started. Upon determination of the binarization threshold in the binarization threshold initialization step 404, the binarization threshold mark is displayed at the position of the particular binarization threshold on the monitor 1113 while at the same time displaying the binarized image acquired based on the particular binarization threshold. In similar fashion, each time the process of steps 405 to 409 is repeated, the binarization threshold mark is updated and displayed at the position of the particular binarization threshold on the monitor 1113 while at the same time updating and displaying the binarized image acquired based on the particular binarization threshold. Once a candidate for the first binarization threshold is determined, the candidate mark 806a is also displayed.

Similarly, once the processing operation of the flowchart of FIG. 5 is executed and candidates for the second binarization threshold are determined, the candidate mark 807a thereof is displayed. Further, upon determination of the third binarization threshold in the third intruding object detection threshold determining step 109 in the flowchart of FIG. 1, the candidate mark (not shown) thereof is also displayed. The monitor operator selects what is considered the proper binarization threshold by the input unit 1102 so that the intruding object detection threshold is set, and the mark thereof (not shown) is displayed on the monitor 1113. These marks not shown are arranged in an arbitrary form along the level gauge.

In this way, the binarization threshold mark 805 changes with the set binarization threshold, which in turn changes the binarized image 801 accordingly.

Each time the processing operation (such as shown in FIG. 1) is executed (in about three sessions, for example) and each time a candidate for each intruding object detection threshold is obtained, the candidate marks 806a, 806b, 806c, 807a, 807b, 807c and the candidates for the third binarization threshold are displayed in superposition at positions corresponding to the binarization values beside the binarization threshold level gauge 804.

This display on the monitor screen makes it possible to know the manner in which the binarized image 801 is obtained by the intruding object detection threshold being set.

In the embodiments described above, the binarization threshold has been changed upward from the initial value for determining the intruding object detection threshold. Nevertheless, it is obvious that the binarization threshold can alternatively be changed downward from the initial value (maximum value). In such a case, according to the first, second, third and fourth embodiments, the second intruding object detection threshold is first determined followed by determining the first intruding object detection threshold. In determining the first intruding object detection threshold, it is determined in step 505 of FIG. 5, for example, as to whether the size of the rectangle circumscribed about the largest detected object is not less than a predetermined value or not. In the case where the particular size is not less than the predetermined value, the process proceeds to step 508, and the binarization threshold Th used in the binarization processing step 405 is determined as a second intruding object detection threshold TH2. In the case where the size of the rectangle circumscribed about the largest detected object is found to be smaller than a predetermined value in step 508, on the other hand, the process proceeds to step 509, in which 1 is subtracted from the binarization threshold Th, followed by proceeding to the binarization processing step 405. In determining the first intruding object detection threshold, the number of clusters of pixels having the value of "255" included in the binarized image 1204 is counted, for example, in step 407 of FIG. 4, and unless the particular number is 0, the process proceeds to step 408 in which the binarization threshold Th used in the binarization processing step 405 less 1 is determined as the first intruding object m detection threshold TH1. In the case where the number of clusters of pixels assuming the value "255" is 0 as counted in step 407, on the other hand, 1 is subtracted from the binarization threshold Th and the process proceeds to the binarization processing step 405. The detailed correction in each of the above-mentioned embodiments for determining the intruding object detection threshold by changing the direction in which the binarization threshold Th is reduced from the initial value is known to those skilled in the art from the description of the specification, and will require no further explanation.

As a result, the intruding object detection threshold whereby the noises other than the intruding object can be removed from the input image obtained by the imaging device and the intruding object detection threshold based on the detection of the reference intruding object contained in the imaging field of view are automatically calculated. By selecting one of the intruding object detection thresholds thus calculated, an intruding object detection threshold can be easily determined. Thus the intruding object detection threshold can be easily set without a high skill even in the case where the luminance or time zone in the monitor field of view or the stop of the lens undergoes a change, thereby greatly widening the range of application of the intruding object recognition apparatus.

What is claimed is:

1. An object detection method for detecting an object present in an image obtained from an imaging device by comparing at least two images, comprising the steps of:
   generating a first comparison image representing a result of comparison made between a first input image from said imaging device and a reference image stored in a storage device;
   threshold-processing said first comparison image using a predetermined threshold value, changing said threshold value until a noise level of said threshold-processed image becomes not greater than a predetermined value and setting the threshold value with which the noise level of said threshold-processed image becomes not greater than the predetermined value, as a first threshold value;
   generating a second comparison image which represents a result of comparison made between a second input image including an object from said imaging device and said reference image stored in said storage device;
   threshold-processing said second comparison image using a predetermined threshold, changing said threshold until the size of the object in the threshold-processed image becomes not greater than a predetermined value and setting the threshold value with which the size of said object in said threshold-processed image becomes not greater than the predetermined value, as a second threshold value;
   setting a third threshold value within a range including said first and second threshold values and
   detecting an object based on said third threshold value.

2. The object detecting method according to claim 1, further comprising the step of:
   displaying marks indicating said first and second threshold values.

3. An object detection apparatus for detecting an object present in an image obtained from an imaging device by comparing at least two images, comprising:
   an imaging device which outputs a first input image and a second input image;
   a first storage device which stores a reference image;
   a processing unit which generates a first comparison image representing a result of comparison made between said first input image and said reference image;
   a first threshold-processing unit which threshold-processes said first comparison image using a predetermined threshold value,
   wherein said first threshold-processing unit changes said threshold value until a noise component of the threshold-processed image becomes no greater than a predetermined value and outputs, as a first threshold value, the threshold value with which said noise component of said threshold-processed first comparison image becomes no greater than the predetermined value;
   another processing unit which generates a second comparison image representing a result of comparison between said second input image and said reference image stored in said first storage device;
   a second threshold-processing unit which threshold-processes said second comparison image using another predetermined threshold value, wherein said second threshold-processing unit changes said another threshold value until a size of an object in said threshold-processed image becomes no greater than a predetermined size and outputs, as a second threshold value, the threshold value with which the size of said object in said threshold-processed second comparison image becomes no greater than said predetermined size;
   a threshold setting unit which sets a third threshold value within a range including said first threshold value and second threshold value and
   a detection unit which detects an object based on said set third threshold value.

4. The object detecting apparatus according to claim 3, further comprising:
   a threshold value display unit for displaying marks indicating said first and second threshold values.

* * * * *